United States Patent
Kubo et al.

(10) Patent No.: US 8,383,765 B2
(45) Date of Patent: Feb. 26, 2013

(54) POLYESTER FOR TONER

(75) Inventors: Takashi Kubo, Wakayama (JP);
Yoshitomo Kimura, Kinokawa (JP);
Yoshihiro Ueno, Wakayama (JP);
Yasunori Inagaki, Wakayama (JP)

(73) Assignee: Kao Corporation, Tokyo (JP)

( * ) Notice: Subject to any disclaimer, the term of this patent is extended or adjusted under 35 U.S.C. 154(b) by 52 days.

(21) Appl. No.: 12/297,956

(22) PCT Filed: Apr. 16, 2007

(86) PCT No.: PCT/JP2007/058290
§ 371 (c)(1),
(2), (4) Date: Oct. 21, 2008

(87) PCT Pub. No.: WO2007/123090
PCT Pub. Date: Nov. 1, 2007

(65) Prior Publication Data
US 2009/0156784 A1    Jun. 18, 2009

(30) Foreign Application Priority Data

Apr. 21, 2006 (JP) ................................. 2006-117307
Apr. 21, 2006 (JP) ................................. 2006-117310

(51) Int. Cl.
| | | |
|---|---|---|
| C09F 1/02 | (2006.01) | |
| C09F 1/04 | (2006.01) | |
| C08L 89/00 | (2006.01) | |
| C08L 91/00 | (2006.01) | |
| C08L 93/00 | (2006.01) | |
| C08L 95/00 | (2006.01) | |
| C08L 97/00 | (2006.01) | |
| C08L 99/00 | (2006.01) | |
| C09D 4/00 | (2006.01) | |
| C09D 101/00 | (2006.01) | |
| C09D 201/00 | (2006.01) | |

(52) U.S. Cl. ......... 530/211; 530/214; 530/215; 106/218
(58) Field of Classification Search .................. 530/211, 530/214, 215; 106/218
See application file for complete search history.

(56) References Cited

U.S. PATENT DOCUMENTS

| | | | | |
|---|---|---|---|---|
| 2,369,109 A | * | 2/1945 | Rummelsburg ............... 530/212 |
| 2,434,168 A | * | 1/1948 | Krumbhaar ................... 530/216 |
| 2,628,226 A | * | 2/1953 | Lawrence et al. ............. 549/240 |
| 2,653,142 A | * | 9/1953 | Cody et al. ................... 530/217 |
| 2,773,859 A | * | 12/1956 | Rummelsburg ............... 530/212 |
| 3,317,445 A | * | 5/1967 | Halbrook et al. ............. 523/527 |
| 3,497,490 A | * | 2/1970 | Geoghegan et al. .......... 530/214 |
| 3,787,342 A | * | 1/1974 | Berry et al. ................... 524/606 |
| 4,115,330 A | | 9/1978 | Lawson |
| 4,260,550 A | * | 4/1981 | Armstrong et al. ............... 560/6 |
| 4,508,806 A | * | 4/1985 | Oseto et al. ................. 430/109.2 |
| 4,643,848 A | * | 2/1987 | Thomas et al. ............... 530/213 |
| 4,744,925 A | * | 5/1988 | Lampo et al. ................. 530/213 |
| 4,751,025 A | * | 6/1988 | Olechowski et al. ......... 530/214 |
| 5,073,623 A | * | 12/1991 | Prantl et al. .................. 530/210 |
| 5,118,590 A | * | 6/1992 | Kakimi ......................... 430/138 |
| 5,126,224 A | * | 6/1992 | Hyosu et al. ............... 430/109.3 |
| 5,162,496 A | * | 11/1992 | Johnson, Jr. .................. 530/212 |
| 5,177,133 A | * | 1/1993 | Peck et al. .................... 524/139 |
| 5,180,774 A | * | 1/1993 | LeVine ....................... 525/54.44 |
| 5,212,213 A | * | 5/1993 | Hutter ............................ 522/81 |
| 5,399,660 A | * | 3/1995 | Uchida et al. ............... 528/295.3 |
| 5,420,229 A | * | 5/1995 | Burke et al. .................. 528/335 |
| 5,552,519 A | * | 9/1996 | Hemmings et al. ........... 530/216 |
| 5,559,206 A | * | 9/1996 | Williams ...................... 530/210 |
| 5,698,668 A | * | 12/1997 | Bender ......................... 530/200 |
| 5,969,092 A | * | 10/1999 | Karvo ........................... 530/218 |
| 6,326,115 B1 | | 12/2001 | Nakanishi et al. |
| 2001/0046634 A1 | * | 11/2001 | Tomita et al. .............. 430/108.1 |
| 2004/0038017 A1 | * | 2/2004 | Tutin et al. ................. 428/297.4 |
| 2005/0064310 A1 | | 3/2005 | Masuda et al. |
| 2005/0245694 A1 | | 11/2005 | Matsumura et al. |
| 2006/0078815 A1 | | 4/2006 | Ito et al. |
| 2006/0252914 A1 | * | 11/2006 | Czebotar et al. ............. 530/210 |
| 2007/0219313 A1 | | 9/2007 | Mizuhata et al. |
| 2007/0221091 A1 | * | 9/2007 | Shimoyama et al. ...... 106/31.13 |
| 2008/0248414 A1 | | 10/2008 | Mizuhata et al. |
| 2009/0036635 A1 | * | 2/2009 | Shirai et al. .................. 528/181 |

FOREIGN PATENT DOCUMENTS

| | | |
|---|---|---|
| EP | 1 580 609 A1 | 9/2005 |
| GB | 832010 | 4/1960 |
| JP | 02-127657 | 5/1990 |
| JP | 04-070765 | 3/1992 |
| JP | 04-307557 | 10/1992 |
| JP | 07-286139 | 10/1995 |
| JP | 08-020636 | 1/1996 |
| JP | 10-239903 | 9/1998 |
| JP | 11-133668 | 5/1999 |
| JP | 2000-169563 | 6/2000 |
| JP | 2003-105071 | 4/2003 |
| JP | 2004-155908 | 6/2004 |
| JP | 2004-245854 | 9/2004 |
| JP | 2004-264318 | 9/2004 |
| JP | 2005-115352 | 4/2005 |
| JP | 2005-290084 | 10/2005 |
| JP | 2005-350597 | 12/2005 |

OTHER PUBLICATIONS

Translation of JP 04-307557 A, 2010.*

(Continued)

Primary Examiner — Liam Heincer
(74) Attorney, Agent, or Firm — Oblon, Spivak, McClelland, Maier & Neustadt, L.L.P.

(57) ABSTRACT

A polyester for a toner, obtainable by polycondensing an alcohol component and a carboxylic acid component containing a fumaric acid-modified rosin; and a toner containing the polyester for a toner. The polyester for a toner of the present invention is usable as a resin binder for a toner usable in, for example, developing electrostatic latent images formed in electrophotography, electrostatic recording method, electrostatic printing method or the like.

18 Claims, No Drawings

OTHER PUBLICATIONS

Office Action issued Dec. 27, 2010, in Japanese Patent Application No. 2006-117310.
Office Action issued Dec. 27, 2010, in Japanese Patent Application No. 2006-117307.
Office Action issued Oct. 26, 2010, in Chinese Patent Application No. 200780013268.7 with English translation.
Extended European Search Report issued Dec. 5, 2011 in patent application No. 07741726.9.

* cited by examiner

POLYESTER FOR TONER

TECHNICAL FIELD

The present invention relates to a polyester for a toner usable as a resin binder for a toner usable in, for example, developing latent images formed in electrophotography, electrostatic recording method, electrostatic printing method or the like, and a toner containing the polyester.

BACKGROUND ART

With the development of electrophotographic techniques, a toner having excellent low-temperature fixing ability and storage ability (blocking resistance) has been required. A toner containing a linear polyester resin of which physical properties such as a molecular weight are defined (see Patent Publication 1); a toner containing a nonlinear cross-linked polyester resin in which a rosin is used as an acid component in the polyester (see Patent Publication 2); a toner with improved fixing ability in which a rosin modified with maleic acid is used (see Patent Publication 3); and the like have been reported. In addition, a toner containing a low-molecular weight polyester in which an aliphatic alcohol is used as a monomer as an alcohol component, and a high-molecular weight polyester has been reported (see Patent Publication 4).
Patent Publication 1: JP-A-2004-245854
Patent Publication 2: JP-A-Hei-4-70765
Patent Publication 3: JP-A-Hei-4-307557
Patent Publication 4: JP-A-Hei-2-127657

SUMMARY OF THE INVENTION

The present invention relates to a polyester for a toner, obtainable by polycondensing an alcohol component and a carboxylic acid component containing a fumaric acid-modified rosin; and a toner containing the polyester for a toner.

DETAILED DESCRIPTION OF THE INVENTION

However, with further progress in speeding up and energy conservation of the machine in the recent years, it has been found that conventional resin binders for toners do not sufficiently meet the demands of the market. In other words, it has become very difficult to maintain a sufficient fixing strength due to the shortening of a fixing time in the fixing step and lowering of a temperature of a heating temperature fed from the fixing device.

On the other hand, if a softening point of a resin is tried to be lowered or the like in order to increase low-temperature fixing ability, the lowering of a glass transition temperature inevitably accompanies, whereby resulting in worsening of storage ability such as undesired aggregation of the toner.

In addition, while the rosin usable in Patent Publication 2 or Patent Publication 3 is effective in the improvement of low-temperature fixing ability, a further improvement for storage ability is in demand, and at the same time there is a disadvantage that an odor is more likely to be generated depending upon the kinds of the rosins.

Further, although the polyester in which the aliphatic alcohol is used has excellent fixing ability, there is a disadvantage that the resins are fused during the pulverization because its pulverizability is too excellent, so that the productivity is rather worsened.

The present invention relates to a polyester for a toner having excellent low-temperature fixing ability, storage ability, and durability and having reduced generation of an odor, and a toner containing the polyester. Further, the present invention relates to a polyester for a toner not only having excellent low-temperature fixing ability, storage ability, and durability, but also having excellent offset resistance and pulverizability, and a toner containing the polyester.

The toner containing the polyester for a toner of the present invention exhibits excellent effects of having excellent low-temperature fixing ability, storage ability, and durability, and having reduced generation of an odor. In addition, in a case of a toner obtained by using the polyester of the present invention obtained from an alcohol component containing an aliphatic polyhydric alcohol, in addition to the above-mentioned effects, the toner exhibits excellent offset resistance and pulverizability.

A significant feature in the polyester for a toner, obtainable by polycondensing an alcohol component and a carboxylic acid component, of the present invention resides in that the carboxylic acid component contains a fumaric acid-modified rosin. Since the polyester contains a fumaric acid-modified rosin, fixing can be carried out at a very low temperature, whereby improving storage ability and durability. A maleic acid-modified rosin obtained by modification with maleic acid, which is a conventionally used modified rosin, has three functional groups, the modified rosin functions as a cross-linking agent. Therefore, a polyester obtained from a carboxylic acid component containing a large amount of a conventionally used maleic acid-modified rosin in order to increase the fixing ability contains a low-molecular weight component that worsens durability in a large amount, while containing a large amount of a high-molecular component effective in durability, so that its durability is insufficient. On the other hand, if the amount of the maleic acid-modified rosin is reduced, the low-temperature fixing ability of the resulting polyester is lowered. However, the fumaric acid-modified rosin usable in the present invention has a very high glass transition temperature (Tg) as compared to the conventional rosin and the maleic acid-modified rosin, so that a low-molecular weight component is reduced; therefore, it is presumed that surprising effects that low-temperature fixing ability and contradictory physical properties thereto, such as offset resistance and storage ability, can be satisfied are exhibited.

The fumaric acid-modified rosin in the present invention refers to a rosin modified with fumaric acid, and obtained by an addition reaction of fumaric acid to a rosin of which main component is abietic acid, neoabietic acid, palustric acid, pimaric acid, isopimaric acid, sandaracopimaric acid, dehydroabietic acid, levopimaric acid, or the like. Specifically, the modified rosin can be obtained through a Diels-Alder reaction between levopimaric acid, abietic acid, neoabietic acid, and palustric acid, having a conjugated double bond in the main component of the rosin, and fumaric acid while heating.

The rosin has a modification degree with fumaric acid (fumaric acid-modified degree) of preferably from 5 to 105, more preferably from 20 to 105, and even more preferably from 40 to 105, and even more preferably from 60 to 105, from the viewpoint of increasing a molecular weight of the polyester, thereby increasing its glass transition temperature.

The fumaric acid-modified degree is calculated by the formula (A):

[Su 1]

$$\text{Fumaric Acid-Modified Degree} = \frac{X_1 - Y}{X_2 - Y} \times 100 \qquad (A)$$

wherein $X_1$ is a SP value of a fumaric acid-modified rosin of which modified degree is calculated, $X_2$ is a SP value of a fumaric acid-modified rosin obtainable by reacting one mol of fumaric acid and 0.7 mol of a rosin, and Y is a SP value of the rosin.

Here, the SP value means a softening point as determined with a ring-and-ball type automatic softening point tester described later. The molecule of the formula (A) means an increased degree of a SP value of the rosin modified with fumaric acid, where the larger the value of the formula (A), the higher the degree of modification.

The fumaric acid-modified rosin has a glass transition temperature of preferably from 40° to 90° C., more preferably from 45° to 85° C., and even more preferably from 50° to 80° C., from the viewpoint of increasing the storage ability of the resulting polyester.

A method for producing a fumaric acid-modified rosin is not particularly limited. For example, a fumaric acid-modified rosin can be obtained by the steps of mixing a rosin and fumaric and heating to a temperature of 180° to 260° C. or so, to carry out a Diels-Alder reaction, thereby adding (meth) acrylic acid to an acid containing a conjugated double bond contained in the rosin.

Further, it is preferable that the rosin and the fumaric acid are allowed to react in the presence of a phenol, from the viewpoint of efficiently reacting the rosin and the fumaric acid. The phenol is preferably a dihydric phenol and a phenolic compound having at least a substituent at an ortho-position to the hydroxyl group (hereinafter referred to as a hindered phenol), and the hindered phenol is more preferred.

The dihydric phenol means a compound in which two OH groups are bonded to a benzene ring, but other substituents are not bonded thereto, and hydroquinone is preferred.

The hindered phenol includes mono-t-butyl-p-cresol, mono-t-butyl-m-cresol, t-butyl catechol, 2,5-di-t-butyl hydroquinone, 2,5-di-t-amyl hydroquinone, propyl gallate, 4,4'-methylenebis(2,6-t-butylphenol), 4,4'-isopropylidenebis(2,6-di-t-butylphenol), 4,4'-butylidenebis(3-methyl-6-t-butylphenol), butylhydroxyanisole, 2,6-di-t-butyl-p-cresol, 2,6-di-t-butylphenol, 2,6-di-t-butyl-4-ethylphenol, 2,4,6-tri-t-butylphenol, octadecyl-3-(4-hydroxy-3',5'-di-t-butylphenyl)propionate, distearyl(4-hydroxy-3-methyl-5-t-butyl) benzyl malonate, 6-(4-hydroxy-3,5-di-t-butylanilino)-2,4-bisoctylthio-1,3,5-triazine, 2,6-diphenyl-4-octadecanoxyphenol, 2,2'-methylenebis(4-methyl-6-t-butylphenol), 2,2'-methylenebis(4-ethyl-6-t-butylphenol), 2,2'-isobutylidenebis(4,6-dimethylphenol), 2,2'-dihydroxy-3,3'-di-(α-methylcyclohexyl)-5,5'-dimethyldiphenylmethane, 2,2'-methylenebis(4-methyl-6-cyclohexylphenol), tris[β-(3,5-di-t-butyl-4-hydroxyphenyl)propionyloxyethyl] isocyanurate, 1,3,5-tris(2,6-dimethyl-3-hydroxy-4-t-butylbenzyl) isocyanurate, tris(3,5-di-t-butyl-4-hydroxyphenol) isocyanurate, 1,1,3'-tris(2-methyl-4-hydroxy-5-t-butylphenyl)butane, 2,6-bis(2'-hydroxy-3'-t-butyl-5'-methylbenzyl)-4-methylphenol, N,N'-hexamethylenebis(3,5-di-t-butyl-4-hydroxyhydrocinnamate), hexamethyleneglycolbis[β-(3,5-di-t-butyl-4-hydroxyphenyl)propionate], triethyleneglycolbis[β-(3-t-butyl-5-methyl-4-hydroxyphenyl)propionate], tetrakis[methylene-3-(3,5-di-t-butyl-4-hydroxyphenyl)propionate]methane, and the like. Among them, t-butyl catechol is preferred.

The amount of the phenolic compound used is preferably from 0.001 to 0.5 parts by weight, more preferably from 0.003 to 0.1 parts by weight, and even more preferably from 0.005 to 0.1 parts by weight, based on 100 parts by weight of the raw material monomers for the fumaric acid-modified rosin.

The fumaric acid-modified rosin may be used as it is, or may be further purified through a procedure such as distillation and used.

The rosin used in the fumaric acid-modified rosin in the present invention includes natural rosins obtained from pine trees, isomerized rosins, dimerized rosins, polymerized rosins, and disproportionate rosins, and a known rosin can be used without particular limitation, so long as the rosin may be a rosin of which main components are abietic acid, neoabietic acid, palustric acid, pimaric acid, isopimaric acid, sandaracopimaric acid, dehydroabietic acid, levopimaric acid, and the like. From the viewpoint of color, natural rosins, such as a tall rosin obtained from a tall oil obtainable as a by-product in the process of manufacturing a natural rosin pulp, gum rosin obtainable from a crude turpentine, a wood rosin obtained from stumps of pine tree, and the like are preferred. The tall rosin is more preferred, from the viewpoint of low-temperature fixing ability.

The fumaric acid-modified rosin in the present invention is obtained through a Diels-Alder reaction while heating, so that impurities which are causations for an odor are reduced making it less odorous. From the viewpoint of further reducing an odor and improving storage ability, the fumaric acid-modified rosin is preferably obtained by modification of a rosin having reduced impurities through a purification step (purified rosin) with fumaric acid, and more preferably obtained by modification of a purified tall rosin with fumaric acid.

The purified rosin in the present invention is a rosin from which impurities are reduced by a purification step. The impurities contained in the rosin can be removed by purifying the rosin. The main impurities include 2-methylpropane, acetaldehyde, 3-methyl-2-butanone, 2-methylpropanoic acid, butanoic acid, pentanoic acid, n-hexanal, octane, hexanoic acid, benzaldehyde, 2-pentylfuran, 2,6-dimethylcyclohexanone, 1-methyl-2-(1-methylethyl)benzene, 3,5-dimethyl-2-cyclohexene, 4-(1-methylethyl)benzaldehyde, and the like. In the present invention, peak intensities of three kinds of impurities of those listed above, hexanoic acid, pentanoic acid, and benzaldehyde, which are detected as volatile components according to headspace GC-MS method, can be used as an index for a purified rosin. Here, the reason why that the specified volatile components are used as indexes, not in absolute amounts of impurities, is in that the use of the purified rosin in the present invention has an objective of improvement in odor against conventional polyesters using rosins.

Specifically, the purified rosin in the present invention refers to a rosin in which a peak intensity of hexanoic acid is $0.8 \times 10^7$ or less, a peak intensity of pentanoic acid is $0.4 \times 10^7$ or less, and a peak intensity of benzaldehyde is $0.4 \times 10^7$ or less, under measurement conditions for headspace GC-MS method described later. Further, from the viewpoint of storage ability and odor, the peak intensity of hexanoic acid is preferably $0.6 \times 10^7$ or less, and more preferably $0.5 \times 10^7$ or less. The peak intensity of pentanoic acid is preferably $0.3 \times 10^7$ or less, and more preferably $0.2 \times 10^7$ or less. The peak intensity of benzaldehyde is preferably $0.3 \times 10^7$ or less, and more preferably $0.2 \times 10^7$ or less.

Further, it is preferable that n-hexanal and 2-pentylfuran are reduced in addition to the three kinds of substances mentioned above, from the viewpoint of storage ability and odor. The peak intensity of n-hexanal is preferably $1.7 \times 10^7$ or less, more preferably $1.6 \times 10^7$ or less, and even more preferably $1.5 \times 10^7$ or less. In addition, the peak intensity of 2-pentylfuran is preferably $1.0 \times 10^7$ or less, more preferably $0.9 \times 10^7$ or less, and even more preferably $0.8 \times 10^7$ or less.

As a method of purifying a rosin, a known method can be utilized, and the method includes a method by distillation, recrystallization, extraction or the like, and it is preferable that the rosin is purified by distillation. As a method of distillation, a method described, for example, in JP-A-Hei-7-286139 can be utilized. The method of distillation includes vacuum distillation, molecular distillation, steam distillation, and the like, and it is preferable that the rosin is purified by vacuum distillation. For example, distillation is carried out usually at a pressure of 6.67 kPa or less and at a stilling temperature of from 200° to 300° C., an ordinary simple distillation as well as a method of thin-film distillation, rectification, or the like can be applied. The high-molecular weight compound is removed as a pitch component in an amount of from 2 to 10% by weight, and at the same time an initial distillate is removed in an amount of from 2 to 10% by weight, each based on the charged rosin under ordinary distillation conditions.

The rosin before the modification has a softening point of preferably from 50° to 100° C., more preferably from 60° to 90° C., and even more preferably from 65° to 85° C. The softening point of the rosin in the present invention means a softening point determined when a rosin is once melted, and air-cooled for 1 hour under environmental conditions of a temperature of 25° C. and a relative humidity of 50%, in accordance with a method described later.

The rosin before the modification has a glass transition temperature of preferably from 10° to 50° C., and more preferably from 15° to 50° C., in consideration of the glass transition temperature of the rosin after modification with fumaric acid.

Further, the rosin before the modification has an acid value of preferably from 100 to 200 mg KOH/g, more preferably from 130 to 180 mg KOH/g, and even more preferably from 150 to 170 mg KOH/g.

The fumaric acid-modified rosin is contained in an amount of preferably 5% by weight or more, more preferably 8% by weight or more, and even more preferably 10% by weight or more, of the carboxylic acid component, from the viewpoint of low-temperature fixing ability. In addition, the fumaric acid-modified rosin is contained in an amount of preferably 85% by weight or less, more preferably 70% by weight or less, even more preferably 60% by weight or less, and even more preferably 50% by weight or less, from the viewpoint of storage ability. From these viewpoints, the fumaric acid-modified rosin is contained in an amount of preferably from 5 to 85% by weight, more preferably from 5 to 70% by weight, even more preferably from 8 to 60% by weight, and even more preferably from 10 to 50% by weight, of the carboxylic acid component.

The carboxylic acid compound other than the fumaric acid-modified rosin, contained in the carboxylic acid component, includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid, and n-dodecenylsuccinic acid; aromatic dicarboxylic acids such as phthalic acid, isophthalic acid, and terephthalic acid; alicyclic dicarboxylic acids such as cyclohexanedicarboxylic acid; tricarboxylic or higher polycarboxylic acids such as trimellitic acid and pyromellitic acid; acid anhydrides thereof, alkyl (1 to 3 carbon atoms) esters thereof, and the like. The carboxylic acid, the anhydride of the carboxylic acid and the alkyl ester of the carboxylic acid as exemplified above are collectively referred to herein as a carboxylic acid compound.

It is preferable that the alcohol component contains an aliphatic polyhydric alcohol, from the viewpoint of offset resistance. Since the aliphatic polyhydric alcohol component is molecularly compact and has a high reactivity, a polyester having a large number-average molecular weight is obtained, even when a fumaric acid-modified rosin being molecularly bulky and having a low reactivity is used. In other words, a polyester having a reduced low-molecular weight component and a large number-average molecular weight is obtained by polycondensing an alcohol component containing an aliphatic polyhydric alcohol and a carboxylic acid component containing a fumaric acid-modified rosin, so that it can be deduced that low-temperature fixing ability and contradictory physical properties thereto, such as offset resistance and storage ability can be satisfied, without impairing pulverizability.

The aliphatic polyhydric alcohol is preferably a dihydric to hexahydric aliphatic polyhydric alcohol, and more preferably a dihydric to trihydric aliphatic polyhydric alcohol, from the viewpoint of its reactivity with a carboxylic acid containing a modified rosin. It is preferable that the aliphatic polyhydric alcohol contains an aliphatic polyhydric alcohol having 2 to 6 carbon atoms of which molecular structure is more compact and rich in reactivity. The aliphatic polyhydric alcohol having 2 to 6 carbon atoms includes ethylene glycol, neopentyl glycol, 1,2-propanediol, 1,3-propanediol, 1,4-butanediol, 1,6-hexanediol, 2,3-butanediol, pentaerythritol, trimethylolpropane, sorbitol, glycerol, and the like. Among them, 1,2-propanediol, 1,3-propanediol, and glycerol are preferred. The aliphatic polyhydric alcohol having 2 to 6 carbon atoms is contained in an amount of preferably 60% by mol or more, more preferably 80% by mol or more, even more preferably 90% by mol or more, and even more preferably substantially 100% by mol, of the aliphatic polyhydric alcohol.

The aliphatic polyhydric alcohol is contained in an amount of preferably 50% by mol or more, more preferably 60% by mol or more, even more preferably 85% by mol or more, and even more preferably substantially 100% by mol, of the alcohol component, from the viewpoint of reactivity with the fumaric acid-modified rosin.

On the other hand, it is preferable that the alcohol component contains an alkylene oxide adduct of bisphenol A represented by the formula (I):

[Ka 1]

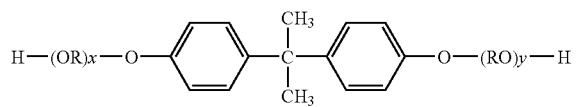

(I)

wherein RO is an alkylene oxide; R is an alkylene group having 2 or 3 carbon atoms; x and y are positive numbers showing an average number of moles of alkylene oxide added, wherein a sum of x and y is from 1 to 16, preferably from 1 to 8, and more preferably from 1.5 to 4,
from the viewpoint of triboelectric chargeability and durability.

The alkylene oxide adduct of bisphenol A represented by the formula (I) includes alkylene (2 to 3 carbon atoms) oxide adducts (average number of moles added: 1 to 16) of bisphenol A, such as polyoxypropylene(2.2)-2,2-bis(4-hydroxyphenyl)propane, and polyoxyethylene(2.2)-2,2-bis(4-hydroxyphenyl)propane, and the like.

The compound represented by the formula (I) is contained in an amount of preferably 30% by mol or more, more preferably 50% by mol or more, even more preferably 80% by mol or more, and even more preferably substantially 100% by mol, of the alcohol component, from the viewpoint of triboelectric chargeability and durability.

The alcohol component other than the aliphatic polyhydric alcohol and the compound represented by the formula (I) mentioned above includes 1,4-cyclohexanedimethanol, hydrogenated bisphenol A, and alkylene (2 to 4 carbon atoms) oxide adducts (average number of moles added: 1 to 16) thereof, and the like.

It is preferable that in the polyester of the present invention, the alcohol component and/or the carboxylic acid component contains a trivalent or higher polyvalent raw material monomer other than the fumaric acid-modified rosin, i.e. a trihydric or higher polyhydric alcohol and/or a tricarboxylic or higher polycarboxylic acid compound, within the range so as not to impair the storage ability, from the viewpoint of reducing residual monomers, and improving fixing ability and offset resistance. The (meth)acrylic acid-modified rosin usable in the present invention is a rosin having two functional groups, a trivalent or higher polyvalent raw material monomer can be used without impairing low-temperature fixing ability of the rosin, whereby the residual monomers are reduced while maintaining low-temperature fixing ability, and further storage ability and offset resistance can be improved. The tricarboxylic or higher polycarboxylic acid compound is contained in an amount of preferably from 0.001 to 40 mol, and more preferably from 0.1 to 25 mol, based on 100 mol of the alcohol component, and the trihydric or higher polyhydric alcohol is contained in an amount of preferably from 0.001 to 40% by mol, and more preferably from 0.1 to 25% by mol, of the alcohol component, from these viewpoints.

In the trivalent or higher polyvalent raw material monomers, the tricarboxylic or higher polycarboxylic acid compound is preferably trimellitic acid and a derivative thereof, and the trihydric or higher polyhydric alcohol includes glycerol, pentaerythritol, trimethylolpropane, sorbitol, and alkylene (2 to 4 carbon atoms) oxide (average number of moles 1 to 16) adducts thereof. Among them, glycerol, trimellitic acid and a derivative thereof are preferred because these compounds are not only effective in acting as a branching site or as a cross-linking agent, but also improving low-temperature fixing ability.

It is preferable that the polycondensation of an alcohol component with a carboxylic acid component is carried out in the presence of an esterification catalyst. Preferred examples of the esterification catalysts in the present invention include titanium compounds and tin(II) compounds without containing a Sn—C bond. These esterification catalysts can be used alone or in admixture of both kinds.

The titanium compound is preferably a titanium compound having a Ti—O bond, and a compound having an alkoxy group, an alkenyloxy group, or an acyloxy group, having a total number of carbon atoms of from 1 of 28, is more preferable.

Specific examples of the titanium compound include titanium diisopropylate bis(triethanolaminate) [$Ti(C_6H_{14}O_3N)_2(C_3H_7O)_2$], titanium diisopropylate bis(diethanolaminate) [$Ti(C_4H_{10}O_2N)_2(C_3H_7O)_2$], titanium dipentylate bis(triethanolaminate) [$Ti(C_6H_{14}O_3N)_2(C_5H_{11}O)_2$], titanium diethylate bis(triethanolaminate) [$Ti(C_6H_{14}O_3N)_2(C_2H_5O)_2$], titanium dihydroxyoctylate bis(triethanolaminate) [$Ti(C_6H_{14}O_3N)_2(OHC_8H_{16}O)_2$], titanium distearate bis(triethanolaminate) [$Ti(C_6H_{14}O_3N)_2(C_{18}H_{37}O)_2$], titanium triisopropylate triethanolaminate [$Ti(C_6H_{14}O_3N)_1(C_3H_7O)_3$], titanium monopropylate tris(triethanolaminate) [$Ti(C_6H_{14}O_3N)_3(C_3H_7O)_1$], and the like. Among them, titanium diisopropylate bis(triethanolaminate), titanium diisopropylate bis(diethanolaminate) and titanium dipentylate bis(triethanolaminate) are preferable, which are available as marketed products of Matsumoto Trading Co., Ltd.

Other specific examples of the preferred titanium compound include tetra-n-butyl titanate [$Ti(C_4H_9O)_4$], tetrapropyl titanate [$Ti(C_3H_7O)_4$], tetrastearyl titanate [$Ti(C_{18}H_{37}O)_4$], tetramyristyl titanate [$Ti(C_{14}H_{29}O)_4$], tetraoctyl titanate [$Ti(C_8H_{17}O)_4$], dioctyl dihydroxyoctyl titanate [$Ti(C_8H_{17}O)_2(OHC_8H_{16}O)_2$], dimyristyl dioctyl titanate [$Ti(C_{14}H_{29}O)_2(C_8H_{17}O)_2$], and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The titanium compound is present in an amount of preferably from 0.01 to 1.0 part by weight, and more preferably from 0.1 to 0.7 parts by weight, based on 100 parts by weight of a total amount of the alcohol component and the carboxylic acid component.

The tin(II) compound without containing a Sn—C bond is preferably a tin(II) compound having a Sn—O bond, a tin(II) compound having a Sn—X bond, wherein X is a halogen atom, or the like, and the tin(II) compound having a Sn—O bond is more preferable.

The tin (II) compound containing a Sn—O bond includes tin(II) carboxylate having a carboxylate group having 2 to 28 carbon atoms, such as tin(II) oxalate, tin(II) diacetate, tin(II) dioctanoate, tin(II) dilaurate, tin(II) distearate, and tin(II) dioleate; dialkoxy tin(II) having an alkoxy group having 2 to 28 carbon atoms, such as dioctyloxy tin(II), dilauroxy tin(II), distearoxy tin(II), and dioleyloxy tin(II); tin(II) oxide; tin(II) sulfate; and the like, and the compound containing a Sn—X bond, wherein X is a halogen atom, includes tin(II) halides, such as tin(II) chloride and tin(II) bromide, and the like. Among them, a fatty acid tin(II) represented by the formula ($R^1COO)_2Sn$, wherein $R^1$ is an alkyl group or alkenyl group having 5 to 19 carbon atoms, a dialkoxy tin(II) represented by the formula ($R^2O)_2Sn$, wherein $R^2$ is an alkyl group or alkenyl group having 6 to 20 carbon atoms, and tin(II) oxide represented by SnO are preferable, and the fatty acid tin(II) represented by the formula ($R^1COO)_2Sn$ and tin(II) oxide are more preferable, and tin(II) dioctanoate, tin(II) distearate, and tin (II) oxide are even more preferable, from the viewpoint of an effect of initial rise of triboelectric charges and catalytic ability.

The tin(II) compound is present in an amount of preferably from 0.01 to 1.0 part by weight, and more preferably from 0.1 to 0.7 parts by weight, based on 100 parts by weight of the total amount of the alcohol component and the carboxylic acid component.

When the titanium compound and the tin(II) compound are used together, the titanium compound and the tin(II) compound are present in a total amount of preferably from 0.01 to 1.0 part by weight, and more preferably from 0.1 to 0.7 parts by weight, based on 100 parts by weight of the total amount of the alcohol component and the carboxylic acid component.

The polycondensation of the alcohol component and the carboxylic acid component can be carried out, for example, at a temperature of from 180° to 250° C. in an inert gas atmosphere in the presence of the above-mentioned esterification catalyst.

The polyester has a softening point of preferably from 90° to 160° C., more preferably from 95° to 155° C., and even more preferably from 100° to 150° C., from the viewpoint of fixing ability, storage ability, and durability. The polyester has a glass transition temperature of preferably from 45° to 75° C., more preferably from 50° to 75° C., and even more preferably from 50° to 70° C., from the viewpoint of fixing ability, storage ability, and durability. The polyester has an acid value of preferably from 1 to 80 mg KOH/g, more preferably from 5 to 60 mg KOH/g, and even more preferably from 5 to 50 mg KOH/g, and a hydroxyl value of preferably from 1 to 80 mg KOH/g, more preferably from 8 to 50 mg KOH/g, and even more preferably from 8 to 40 mg KOH/g, from the viewpoint of triboelectric chargeability and environmental stability.

In the polyester of the present invention, the low-molecular weight component having a molecular weight of 500 or less ascribed to the residual monomer component and the oligomer component or the like is contained in an amount of preferably 12% or less, more preferably 10% or less, even more preferably 9% or less, and even more preferably 8% or less, of the polyester, from the viewpoint of low-temperature fixing ability, storage ability, and offset resistance. The amount of the low-molecular weight component contained can be reduced by a method of increasing a modified degree of fumaric acid of the rosin, or the like.

Here, the polyester of the present invention may be a modified polyester to an extent that would not substantially impair the properties. The modified polyester refers to, for example, a polyester that is grafted or blocked with phenol, urethane, epoxy, or the like by the method described in JP-A-Hei-11-133668, JP-A-Hei-10-239903, JP-A-Hei-8-20636, or the like.

By using the polyester of the present invention as a resin binder for a toner, a toner that is excellent in both low-temperature fixing ability, storage ability, and durability and having a reduced odor upon fixing can be obtained. In the toner of the present invention, the resin binder may be used together with a known resin binder including, for example, a vinyl resin such as a styrene-acrylic resin, an epoxy resin, or other resin such as a polycarbonate or a polyurethane, within the range that would not impair the effects of the present invention. The polyester of the present invention is contained in an amount of preferably 70% by weight or more, more preferably 80% by weight or more, even more preferably 90% by weight or more, and even more preferably substantially 100% by weight, of the resin binder.

The toner of the present invention may further properly contain an additive such as a colorant, a releasing agent, a charge control agent, a magnetic powder, a fluidity improver, an electric conductivity modifier, an extender, a reinforcing filler such as a fibrous substance, an antioxidant, an anti-aging agent, or a cleanability improver.

As the colorant, all of the dyes, pigments and the like which are used as colorants for toners can be used, and a carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, or the like can be used. In the present invention, the toner may be any of black toner and color toner. The colorant is contained in an amount of preferably from 1 to 40 parts by weight, and more preferably from 2 to 10 parts by weight, based on 100 parts by weight of the resin binder.

The releasing agent includes low-molecular weight polyolefins, such as polyethylenes, polypropylenes, and polybutenes; silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; mineral and petroleum waxes, such as montan wax, ozokerite, ceresin, paraffin wax, microcrystalline wax, and Fischer-Tropsch wax; and the like. These releasing agents may be used alone, or in a combination of two or more kinds.

The releasing agent has a melting point of preferably from 50° to 120° C., and more preferably a temperature equal to or lower than a softening point of a resin binder, taking into consideration the influences on blocking resistance and low-temperature fixing ability of the resin binder. The releasing agent is contained in an amount of preferably from 1 to 20 parts by weight, more preferably from 2 to 15 parts by weight, and even more preferably from 2 to 10 parts, based on 100 parts by weight of the resin binder, taking into consideration of the effects on low-temperature offset, influences on triboelectric chargeability, and the like.

As the charge control agent, any one of negatively chargeable and positively chargeable charge control agents can be used. The negatively chargeable charge control agent includes, for example, metal-containing azo dyes, copper phthalocyanine dyes, metal complexes of alkyl derivatives of salicylic acid, nitroimidazole derivatives, and the like. The positively chargeable charge control agent includes, for example, Nigrosine dyes, triphenylmethane-based dyes, quaternary ammonium salt compounds, polyamine resins, imidazole derivatives and the like. In addition, a polymeric charge control agent such as a resin can be used. The charge control agent is contained in an amount of preferably from 0.1 to 8 parts by weight, and more preferably from 0.2 to 5 parts by weight, based on 100 parts by weight of the resin binder.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. Incidentally, in the case of a pulverized toner produced by the melt-kneading method, the toner can be produced by homogeneously mixing raw materials such as a resin binder, a colorant, and a charge control agent with a mixer such as a Henschel mixer, thereafter melt-kneading the mixture with a closed kneader, a single-screw or twin-screw extruder, an open roller-type kneader, or the like, cooling, pulverizing, and classifying the product. It is preferable that the toner has a volume-median particle size ($D_{50}$) of preferably from 3 to 15 μm. The term "volume-median particle size ($D_{50}$)" as used herein means a particle size at 50% when calculated from particle sizes of smaller particle sizes in the cumulative volume frequency calculated in percentage on the volume basis.

Furthermore, the toner of the present invention may be subjected to an external addition treatment with an external additive such as fine inorganic particles of silica, alumina, titania, zirconia, tin oxide, zinc oxide, and the like, and fine organic particles such as fine resin particles.

As the external additive, silica having a small specific gravity is preferable, from the viewpoint of preventing embedment. The silica is preferably a hydrophobic silica subjected to a hydrophobic treatment, from the viewpoint of environmental stability. The method for hydrophobic treatment is not particularly limited, and an agent for the hydrophobic treatment includes hexamethyldisilazane (HMDS), dimethyldichlorosilane (DMDS), a silicone oil, methyl triethoxysilane, and the like. It is preferable that the processing amount of the agent for the hydrophobic treatment is from 1 to 7 mg/m$^2$ per surface area of the fine inorganic particles.

The external additive has a number-average particle size of preferably from 3 to 300 nm, and more preferably from 5 to 100 nm, from the viewpoint of triboelectric chargeability and prevention of a photosensitive member from being damaged.

The external additive is contained in an amount of preferably from 0.01 to 10 parts by weight, and more preferably from 0.1 to 5 parts by weight, based on 100 parts by weight of the toner matrix particles.

The toner of the present invention can be used as a toner for monocomponent development, or as a two component developer prepared by mixing the toner with a carrier.

In the present invention, the carrier is preferably a carrier having a low saturation magnetization, which forms a soft magnetic brush, from the viewpoint of the image properties.

The saturation magnetization of the carrier is preferably from 40 to 100 Am²/kg, and more preferably from 50 to 90 Am²/kg. The saturation magnetization is preferably 100 Am²/kg or less from the viewpoint of controlling the hardness of the magnetic brush and retaining the tone reproducibility, and preferably 40 Am²/kg or more from the viewpoint of preventing the carrier adhesion and the toner scattering.

As a core material for the carrier, any of a known material can be used without any particular limitation. The core material includes, for example, ferromagnetic metals such as iron, cobalt and nickel; alloys and compounds such as magnetite, hematite, ferrite, copper-zinc-magnesium ferrite, manganese ferrite, and magnesium ferrite; and glass beads; and the like. Among them, iron powder, magnetite, ferrite, copper-zinc-magnesium ferrite, manganese ferrite, and magnesium ferrite are preferable, from the viewpoint of triboelectric chargeability, and ferrite, copper-zinc-magnesium ferrite, manganese ferrite, and magnesium ferrite are more preferable, from the viewpoint of image quality.

It is preferable that the surface of the carrier is coated with a resin, from the viewpoint of reducing the contamination of the carrier. The resin for coating the surface of the carrier may vary depending upon the toner materials, and includes, for example, fluororesins such as polytetrafluoroethylenes, monochlorotrifluoroethylene polymers and poly(vinylidene fluorides); silicone resins such as polydimethyl siloxane; polyesters, styrenic resins, acrylic resins, polyamides, polyvinyl butyrals, aminoacrylate resins, and the like. These resins can be used alone or in admixture of two or more kinds. In the case where the toner is negatively chargeable, silicone resins are preferable, from the viewpoint of triboelectric chargeability and surface energy. The method of coating a core material with a resin is not particularly limited, and includes, for example, a method of dissolving or suspending a coating material such as a resin in a solvent, and applying the solution or suspension to be deposited on a core material, a method of simply blending in the state of powder, and the like.

In the two component developer of the present invention obtained by mixing a toner and a carrier, a weight ratio of the toner to the carrier, i.e. toner/carrier, is preferably from 1/99 to 10/90, and more preferably from 5/95 to 7/93.

EXAMPLES

The following examples further describe and demonstrate embodiments of the present invention. The examples are given solely for the purposes of illustration and are not to be construed as limitations of the present invention.

[Softening Point of Resins]

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

[Glass Transition Temperatures (Tg) of Resins and Rosins]

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (Seiko Instruments, Inc., "DSC 210") of a sample of which temperature is raised at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Softening Point of Rosins]

(1) Preparation of Samples

Ten grams of a rosin is melted on hot plate at 170° C. for 2 hours. Thereafter, the molten rosin is air-cooled in an environment of an open state at a temperature of 25° C. and relative humidity of 50% for 1 hour, and a cooled product is pulverized with a coffee mill (National Panasonic MK-61M) for 10 seconds.

(2) Measurement

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

[Acid Values of Resins and Rosins]

The acid values are measured as prescribed by a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Values of Resins]

The hydroxyl values are measured as prescribed by a method of JIS K0070.

[Amount of Low-Molecular Weight Component Having Molecular Weight of 500 or Less Contained]

The molecular weight distribution is measured by gel permeation chromatography (GPC). Ten milliliters of tetrahydrofuran is added to 30 mg of a toner, and the mixture is mixed with a ball-mill for 1 hour, and thereafter filtered with a fluororesin filter "FP-200" (manufactured by Sumitomo Electric Industries, Ltd.) having a pore size of 2 µm, to remove an insoluble component, to prepare a sample solution.

The measurement is taken by allowing tetrahydrofuran to flow through a column as an eluent at a flow rate of 1 ml per minute, stabilizing the column in a thermostat at 40° C., and loading 100 µl of a sample solution. Here, using "GMHLX+ G3000HXL" (manufactured by Tosoh Corporation) as an analyzing column, a calibration curve of the molecular weights is drawn from several kinds of monodisperse polystyrenes (those having molecular weights of $2.63 \times 10^3$, $2.06 \times 10^4$, and $1.02 \times 10^5$ manufactured by Tosoh Corporation, and those having molecular weights of $2.10 \times 10^3$, $7.00 \times 10^3$, and $5.04 \times 10^4$ manufactured by GL Sciences Inc.) as standard samples.

The amount of the low-molecular weight component having a molecular weight of 500 or less contained (%) is calculated as a proportion of the area of the corresponding region in the area of the chart obtained by a RI (refractive index) detector, based on the entire area of the chart, i.e. the area of the corresponding region/the entire area of the chart.

[SP Values of Rosins]

A 2.1 g sample in a molten state is injected into a given ring, and the sample is then cooled to room temperature, and thereafter the SP values are measured under the following conditions as prescribed in JIS B7410.

Measuring apparatus: Automatic Ring and Ball Softening Point Tester ASP-MGK2 (manufactured by MEITECH Company Ltd.)

Heating rate: 5° C./min
Temperature at which heating is started: 40° C.
Measurement solvent: glycerol

[Fumaric Acid-Modified Degree of Rosins]

The fumaric acid-modified degree is calculated by the formula (A):

[Su 2]

$$\text{Fumaric Acid-Modified Degree} = \frac{X_1 - Y}{X_2 - Y} \times 100 \quad (A)$$

wherein $X_1$ is a SP value of a fumaric acid-modified rosin of which modified degree is calculated, $X_2$ is a SP value of a fumaric acid-modified rosin obtainable by reacting one mol of fumaric acid and 0.7 mol of a rosin, and Y is a SP value of the rosin.

The SP value shown by $X_2$ is a SP value of a fumaric acid-modified rosin, obtained by raising the temperature of a mixture of 1 mol of fumaric acid, 0.7 mol of a rosin, and 0.4 g of t-butyl catechol from 160° to 200° C. over 2 hours, allowing the mixture to react at 200° C. for 2 hours, and thereafter distilling the reaction mixture under reduced pressure of 5.3 kPa. Here, supposing that an acid value of a rosin is x (mgKOH/g), the molecular weight of 1 mol of the rosin can be calculated by the formula (B):

$$\text{Molecular Weight} = 56100 \div x \quad (B)$$

because x mg($x \times 10^{-3}$ g) of potassium hydroxide (molecular weight: 56.1) would be reacting to 1 g of the rosin.

[Melting Point of Releasing Agent]

A temperature of maximum endothermic peak of the heat of fusion obtained by raising the temperature of a sample at a rate of 10° C./min., the sample prepared by raising the temperature of a sample to 200° C. using a differential scanning calorimeter (Seiko Instruments, Inc., "DSC 210"), and cooling the heated sample from that temperature to 0° C. at a cooling rate of 10° C./min., is referred to as a melting point.

[Number-Average Particle Size of External Additive]

The number-average particle size is obtained by the following formula:

$$\text{Number-Average Particle Size(nm)} = 6/(\Sigma \times \text{Specific Surface Area}(m^2/g)) \times 1000$$

wherein ρ is a specific gravity of a fine inorganic powder or an external additive; and Specific Surface Area is a BET specific surface area obtained by nitrogen adsorption method of a raw powder, or a raw powder before the hydrophobic treatment in the case of an external additive. For example, the specific gravity of silica is 2.2, and the specific gravity of titanium oxide is 4.2.

Incidentally, the above formula is obtained from:

$$\text{BET Specific Surface Area} = S \times (1/m)$$

wherein m(Mass of A Particle)=$4/3 \times \pi \times (R/2)^3 \times$ Density, and S (Surface Area)=$4\pi(R/2)^2$,
supposing that a sphere has a particle size R.

[Volume-Median Particle Size ($D_{50}$) of Toner]

Measuring Apparatus Coulter Multisizer II (manufactured by Beckman Coulter)
Aperture Diameter: 100 μm
Analyzing Software: Coulter Multisizer AccuComp Ver. 1.19 (manufactured by Beckman Coulter)
Electrolytic Solution: "Isotone II" (manufactured by Beckman Coulter)
Dispersion: A 5% electrolytic solution of "EMULGEN 109P" (manufactured by Kao Corporation, polyoxyethylene lauryl ether, HLB: 13.6).
Dispersion Conditions Ten milligrams of a measurement sample is added to 5 ml of the above dispersion, and the mixture is dispersed for 1 minute with a ultrasonic disperser, and 25 ml of an electrolytic solution is added to the dispersion, and further dispersed with a ultrasonic disperser for 1 minute, to prepare a sample dispersion.
Measurement Conditions: A beaker is charged with 100 ml of the electrolytic solution and the dispersion, the 30,000 particles are then measured at a concentration where 30,000 particles can be measured in 20 seconds, and a volume-median particle size ($D_{50}$) is obtained from the particle size distribution.

Purification Example of Rosin

A 2000-ml distillation flask equipped with a fractionation tube, a reflux condenser and a receiver was charged with 1000 g of a tall rosin (Tg: 37.2° C.), and the tall rosin was distilled under a reduced pressure of 1 kPa, and a fractionation component at 195° to 250° C. was collected as a main fractionation component. Hereinafter, the tall resin subjected to purification is referred to as "unpurified rosin," and a rosin collected as a main fractional component is referred to as "purified rosin (Tg: 39.2° C.)."

Twenty grams of the rosin was pulverized with a coffee mill (National Panasonic MK-61M) for 5 seconds, and the rosin having sizes of 1-mm sieve opening-passed were measured off in an amount of 0.5 g in a vial for headspace (20 ml). A headspace gas was sampled, and the results of analyzing impurities in the unpurified rosin and the purified rosin by headspace GC-MS method are shown in Table 1.

[Measurement Conditions for Headspace GC-MS Method]

A. Headspace Sampler (manufactured by Agilent, "HP7694")
Sample Temperature: 200° C.;
Loop Temperature: 200° C.;
Transfer Line Temperature: 200° C.;
Equilibrating Time for Sample Heating: 30 min.;
Vial Pressure Gas: Helium (He);
Vial Pressing Time: 0.3 min.;
Loop Filling Time: 0.03 min.;
Loop Equilibrating Time: 0.3 min.; and
Injection Time: 1 min.

B. GC (Gas Chromatography) (manufactured by Agilent, "HP6890")
Analyzing Column: DB-1 (60 m-320 $\mu m^{-5}$ μm);
Carrier: Helium (He);
Flow Rate Conditions: 1 ml/min.;
Injection Inlet Temperature: 210° C.;
Column Head Pressure: 34.2 kPa;
Injection Mode: split;
Split Ratio: 10:1; and
Oven Temperature Conditions: 45° C. (3 min.)-10° C./min.-280° C. (15 min.).

C. MS (Mass Spectroscopy) (manufactured by Agilent, "HP5973")
Ionization Method EI (Electron Impact) method;
Interface Temperature: 280° C.;
Ion Source Temperature: 230° C.;
Quadrupole Temperature: 150° C.; and
Detection Mode: Scan 29-350 m/s.

TABLE 1

| | Hexanoic Acid | Pentanoic Acid | Benzaldehyde | n-Hexanal | 2-Pentyl-furan | SP Value (° C.) Softening Point (° C.) | Acid Value (mg KOH/g) | Molecuar weight per 1 mol |
|---|---|---|---|---|---|---|---|---|
| Unpurified Rosin | $0.9 \times 10^7$ | $0.6 \times 10^7$ | $0.6 \times 10^7$ | $1.8 \times 10^7$ | $1.1 \times 10^7$ | 77.0 74.3 | 169 | 332 |
| Purified Rosin | $0.4 \times 10^7$ | $0.2 \times 10^7$ | $0.2 \times 10^7$ | $1.4 \times 10^7$ | $0.7 \times 10^7$ | 76.8 75.1 | 166 | 338 |

Measurement of SP Value of Fumaric Acid-Modified Rosin Using Unpurified Rosin, Usable as $X_2$ Value A 1000 ml flask equipped with a fractionating tube, a reflux condenser, and a receiver was charged with 332 g (1 mol) of an unpurified rosin (SP value: 77.0° C.), 81 g (0.7 mol) of fumaric acid, and 0.4 g of t-butyl catechol, the temperature of the mixture was raised from 160° to 200° C. over a period of 2 hours, and the mixture was allowed to react at 200° C. for 2 hours. Thereafter, the reaction mixture was subjected to distillation under reduced pressure of 5.3 kPa to distill away the unreacted fumaric acid and low-boiling point substances from the reaction mixture, to give a fumaric acid-modified rosin. The resulting fumaric acid-modified rosin had a SP value, i.e., a SP value of the fumaric acid-modified rosin using the unpurified rosin, of 130.6° C.

Measurement of SP Value of Fumaric Acid-Modified Rosin Using Purified Rosin, Usable as $X_2$ Value A 1000 ml flask equipped with a fractionating tube, a reflux condenser, and a receiver was charged with 338 g (1 mol) of a purified rosin (SP value: 76.8° C.), 81 g (0.7 mol) of fumaric acid, and 0.4 g of t-butyl catechol, the temperature of the mixture was raised from 160° to 200° C. over a period of 2 hours, and the mixture was allowed to react at 200° C. for 2 hours. Thereafter, the reaction mixture was subjected to distillation under reduced pressure of 5.3 kPa to distill away the unreacted fumaric acid and low-boiling point substances from the reaction mixture, to give a fumaric acid-modified rosin. The resulting fumaric acid-modified rosin had a SP value, i.e. a SP value of the fumaric acid-modified rosin using the purified rosin, of 130.9° C.

Production Example 1 of Fumaric Acid-Modified Rosin

A 10 L flask equipped with a fractionating tube, a reflux condenser, and a receiver was charged with 5408 g (16 mol) of a purified rosin (SP value: 76.8° C.), 928 g (8 mol) of fumaric acid, and 0.4 g of t-butyl catechol, and the temperature of the mixture was raised from 160° to 200° C. over a period of 2 hours. The mixture was allowed to react at 200° C. for 2 hours, and the reaction mixture was then subjected to distillation under reduced pressure of 5.3 kPa, to give a fumaric acid-modified rosin A. The resulting fumaric acid-modified rosin A had a SP value of 130.8° C., a glass transition temperature of 74.4° C., and a fumaric acid-modified degree of 100.

Production Example 2 of Fumaric Acid-Modified Rosin

A 10 L flask equipped with a fractionating tube, a reflux condenser, and a receiver was charged with 5408 g (16 mol) of a purified rosin (SP value: 76.8° C.), 557 g (4.8 mol) of fumaric acid, and 0.4 g of t-butyl catechol, and the temperature of the mixture was raised from 160° to 200° C. over a period of 2 hours. The mixture was allowed to react at 200° C. for 2 hours, and the reaction mixture was then subjected to distillation under reduced pressure of 5.3 kPa, to give a fumaric acid-modified rosin B. The resulting fumaric acid-modified rosin B had a SP value of 115.7° C., a glass transition temperature of 53.9° C., and a fumaric acid-modified degree of 72.

Production Example 3 of Fumaric Acid-Modified Rosin

A 10 L flask equipped with a fractionating tube, a reflux condenser, and a receiver was charged with 5408 g (16 mol) of a purified rosin (SP value: 76.8° C.), 278 g (2.4 mol) of fumaric acid, and 0.4 g of t-butyl catechol, and the temperature of the mixture was raised from 160° to 200° C. over a period of 2 hours. The mixture was allowed to react at 200° C. for 2 hours, and the reaction mixture was then subjected to distillation under reduced pressure of 5.3 kPa, to give a fumaric acid-modified rosin C. The resulting fumaric acid-modified rosin C had a SP value of 98.4° C., a glass transition temperature of 48.3° C., and a fumaric acid-modified degree of 40.

Production Example 4 of Fumaric Acid-Modified Rosin

A 10 L flask equipped with a fractionating tube, a reflux condenser, and a receiver was charged with 5312 g (16 mol) of an unpurified rosin (SP value: 77.0° C.), 928 g (8 mol) of fumaric acid, and 0.4 g of t-butyl catechol, and the temperature of the mixture was raised from 160° to 200° C. over a period of 2 hours. The mixture was allowed to react at 200° C. for 2 hours, and the reaction mixture was then subjected to distillation under reduced pressure of 5.3 kPa, to give a fumaric acid-modified rosin D. The resulting fumaric acid-modified rosin D had a SP value of 130.4° C., a glass transition temperature of 72.1° C., and a fumaric acid-modified degree of 100.

Examples A1 to A5, A7, and A8 and Comparative Example A1

A 5-liter four-necked flask equipped with a nitrogen inlet tube, a dehydration tube, a stirrer and a thermocouple was charged with an alcohol component, a carboxylic acid component other than trimellitic anhydride, and an esterification catalyst, as shown in Table 2, and the mixture was subjected to a polycondensation reaction at 230° C. for 10 hours under nitrogen atmosphere, and thereafter the reaction mixture was allowed to react at 230° C. for and 8 kPa for 1 hour. After cooling the mixture to a temperature of 220° C., the trimellitic anhydride in an amount as shown in Table 2 was introduced into the mixture, and the mixture was allowed to react thereat for 1 hour under normal pressure (101.3 kPa), and thereafter the reaction mixture was allowed to react at 220° C. and 20 kPa until a desired softening point was reached, to give each of the polyesters.

Example A6

A 5-liter four-necked flask equipped with a nitrogen inlet tube, a dehydration tube, a stirrer and a thermocouple was charged with an alcohol component, a carboxylic acid component other than fumaric acid, and an esterification catalyst, as shown in Table 2, and the mixture was subjected to a polycondensation reaction at 230° C. for 10 hours under nitrogen atmosphere, and thereafter the reaction mixture was allowed to react at 230° C. and 8 kPa for 1 hour. After cooling the mixture to a temperature of 180° C., the fumaric acid in an amount as shown in Table 2 was introduced into the mixture, and the mixture was heated to a temperature of 210° C. over 5 hours, and thereafter the reaction mixture was allowed to react at 210° C. and 10 kPa until a desired softening point was reached, to give a polyester.

of 200 r/min and a heating temperature inside the roller of 80° C. The resulting melt-kneaded product was cooled and roughly pulverized, and thereafter pulverized with a jet mill, and a pulverized product was classified, to give a powder having a volume-median particle size ($D_{50}$) of 8.0 μm.

To 100 parts by weight of the resulting powder was added 1.0 part by weight of an external additive "Aerosil R-972" (manufactured by Nippon Aerosil Co., LTD., number-average particle size: 16 nm), and the mixture was blended with a Henschel mixer, to give each of the toners A1 to A8 and a comparative toner A1.

Test Example A1 [Low-Temperature Fixing Ability]

A toner was loaded on a printer "PAGEPRESTO N-4" (manufactured by CASIO COMPUTER CO., LTD., fixing: contact-fixing method, development method: nonmagnetic monocomponent development method, developer roller diameter: 2.3 cm), and an amount of toner adhesion was adjusted to 0.6 mg/cm², to give unfixed images. The obtained

TABLE 2

| | Ex. A1 | Ex. A2 | Ex. A3 | Ex. A4 | Ex. A5 | Ex. A6 | Ex. A7 | Ex. A8 | Comp. Ex. A1 |
|---|---|---|---|---|---|---|---|---|---|
| Alcohol Component | | | | | | | | | |
| BPA-PO[1] | 2450 g | 2450 g | 2450 g | 2100 g | 1960 g | 2800 g | 2450 g | 2450 g | 2450 g |
| BPA-EO[2] | 975 g | 975 g | 975 g | 1300 g | 780 g | 650 g | 975 g | 975 g | 975 g |
| Carboxylic Acid Component | | | | | | | | | |
| Terephthalic Acid | 996 g | 996 g | 996 g | 1162 g | 531 g | 664 g | 830 g | 830 g | 830 g |
| Trimellitic Anhydride | 288 g | 288 g | 288 g | 288 g | 230 g | — | 288 g | 288 g | 288 g |
| Fumaric Acid | — | — | — | — | — | 464 g | — | — | — |
| Unpurified Rosin* | — | — | — | — | — | — | — | — | 672 g |
| Fumaric Acid-Modified Rosin A | 672 g | — | — | 336 g | 1613 g | 672 g | 672 g | — | — |
| Fumaric Acid-Modified Rosin B | — | 672 g | — | — | — | — | — | — | — |
| Fumaric Acid-Modified Rosin C | — | — | 672 g | — | — | — | — | — | — |
| Fumaric Acid-Modified Rosin D | — | — | — | — | — | — | — | 672 g | — |
| Esterification Catalyst | | | | | | | | | |
| Dibutyltin Oxide | — | — | — | — | — | — | 26 g | — | — |
| Tin(II) Dioctanoate | 26 g | 26 g | 26 g | 26 g | 26 g | — | — | 26 g | 26 g |
| Titanium Diisopropylate Bis(Triethanolaminate) | — | — | — | — | — | 26 g | — | — | — |
| Amount (% by weight) of Rosin Contained in Carboxylic Acid Component | 34.4 | 34.4 | 34.4 | 18.8 | 67.9 | 37.3 | 37.5 | 37.5 | 37.5 |
| Physical Properties of Polyester | | | | | | | | | |
| Acid Value (mg KOH/g) | 32.7 | 30.1 | 26.7 | 18.9 | 29.8 | 15.3 | 5.4 | 30.4 | 28.1 |
| Hydroxyl Value (mg KOH/g) | 15 | 10 | 8 | 18 | 18 | 15.7 | 36.6 | 12.8 | 31 |
| Softening Point (° C.) | 124.3 | 122.3 | 118.5 | 143.5 | 105.9 | 108.5 | 123.6 | 119.8 | 110.4 |
| Glass Transition Temperature (° C.) | 69.4 | 66.5 | 61.0 | 72.0 | 58.2 | 56.8 | 66.8 | 62.4 | 55.1 |
| Amount (% by weight) of Low-Molecular Component Having Molecular Weight of 500 or Less, Contained in Carboxylic Acid Component | 4.8 | 6.5 | 7.8 | 6.0 | 9.2 | 6.9 | 8 | 10.2 | 16.9 |

*Unmodified Rosin
[1] Polyoxypropylene(2.2)-2,2-bis(4-hydroxyphenyl)propane
[2] Polyoxyethylene(2.2)-2,2-bis(4-hydroxyphenyl)propane Production Example A1 for Toner One-hundred parts by weight of the polyester each obtained in Examples A1 to A8 and Comparative Example A1, 4 parts by weight of a carbon black "MOGUL L" (manufactured by Cabot Corporation), 1 part by weight of a negatively chargeable control agent "BONTRON S-34" (manufactured by Orient Chemical Co., Ltd.), and 1 part by weight of a polypropylene wax "NP-105" (manufactured by MITSUI CHEMICALS, INC., melting point: 105° C.), as shown in Table 3, were sufficiently mixed with a Henschel mixer, and thereafter the mixture was melt-kneaded with a unidirectional rotary twin-screw extruder at a roller rotational speed unfixed images were subjected to a fixing test by allowing unfixed images to fix while raising a temperature of the fixer roller from 100° to 240° C. with an increment of 5° C. using a fixing apparatus (fixing speed: 250 mm/s) modified so as to enable fixing outside the machine with a fixing apparatus of a contact-fixing type copy machine "AR-505" (manufactured by Sharp Corporation).

"UNICEF Cellophane" tape (manufactured by MITSUBISHI PENCIL CO., LTD., width: 18 mm, JIS Z-1522) was adhered to the fixed images obtained at each fixing temperature, and the resulting fixed images were allowed to pass through the fixing roller of the above fixing apparatus set at 30° C., and the tape was then removed. The optical reflective densities before and after the removal of the tape were measured using a reflective densitometer "RD-915" (manufactured by Macbeth Process Measurements Co.). A temperature of the fixing roller at which the ratio of both of the optical reflective densities, i.e. that after removal/that before removal, initially exceeds 90% is defined as a lowest fixing temperature. The low-temperature fixing ability was evaluated in accordance with the following evaluation criteria. The results are shown in Table 3.

[Evaluation Criteria]
- ⊚: The lowest fixing temperature is lower than 150° C.
- ◯: The lowest fixing temperature is 150° C. or higher and lower than 170° C.
- Δ: The lowest fixing temperature is 170° C. or higher and lower than 180° C.
- x: The lowest fixing temperature is 180° C. or higher.

Test Example A2 [Storage Ability]

Two sets of samples of 4 g of a toner each placed in an open-type cylindrical vessel having a diameter of 5 cm and a height of 2 cm were furnished, where one set of the samples was allowed to stand under the environmental conditions of a temperature of 40° C. and a relative humidity of 60%, and the other set of samples was allowed to stand under environmental conditions of a temperature of 55° C. and a relative humidity of 60%, each for 72 hours. After allowing the toner to stand, the vessel containing the toner was gently shaken, and the presence or absence of the generation of toner aggregation was visually observed. The storage ability was evaluated in accordance with the following evaluation criteria. The results are shown in Table 3.

[Evaluation Criteria]
- ⊚: The toner aggregation is not found at all even under environmental conditions of both at 40° C. and 55° C.
- ◯: Although the toner aggregation is not found under the environmental conditions of 40° C. at all, a slight amount of the lumps of toner aggregation is observed under the environmental conditions of 55° C.
- Δ: Although the lumps of toner aggregation are found in a slight amount under the environmental conditions of 40° C., the toner aggregation is evidently found under the environmental conditions of 55° C.
- x: The toner aggregation is evidently found under both of the environmental conditions of 40° C. and 55° C.

Test Example A3 [Durability]

A toner was loaded to a nonmagnetic monocomponent development system "OKI Microline 18" (manufactured by Oki Data Corporation), and a durability printing test was conducted by continuously printing images of diagonally striped patterns having a blackening ratio of 5.5% under the conditions of 32° C. and a relative humidity of 85%. During the course of printing, black solid images were printed every 500 sheets, and the presence or absence of the lines on the formed images was visually confirmed. At the point where the generation of the lines was confirmed, a durability test was conducted in the maximum of 5000 sheets, and the durability was evaluated by defining the number of printed sheets at the point where the generation of lines was confirmed as the number of durability printing sheets, in accordance with the following evaluation criteria.

[Evaluation Criteria]
- ⊚: No lines are generated up until 5000 sheets, so that the number of durability printing sheets is 5000 sheets or more.
- ◯: The number of durability printing sheets is 2000 sheets or more and less than 5000 sheets.
- x: The number of durability printing sheets is less than 2000 sheets.

Test Example A4 [Odor]

Twenty grams of a toner was weighed in an aluminum cup, and allowed to stand on a hot plate heated to 150° C. for 30 minutes. The odor generated from a toner was evaluated in accordance with the following evaluation criteria. The results are shown in Table 3.

[Evaluation Criteria]
- ⊚: The odor is not sensed at all.
- ◯: Hardly any odor is sensed.
- Δ: Slight odor is sensed, but not posing any practical problems.
- x: The odor is strongly sensed.

TABLE 3

|  | Polyester | Low-Temp. Fixing Ability | Storage Ability | Durability | Odor |
|---|---|---|---|---|---|
| Toner A1 | Ex. A1 | ⊚ | ⊚ | ⊚ | ⊚ |
| Toner A2 | Ex. A2 | ⊚ | ◯ | ⊚ | ⊚ |
| Toner A3 | Ex. A3 | ⊚ | ◯ | ◯ | ⊚ |
| Toner A4 | Ex. A4 | ◯ | ⊚ | ⊚ | ⊚ |
| Toner A5 | Ex. A5 | ⊚ | ◯ | ◯ | ⊚ |
| Toner A6 | Ex. A6 | ⊚ | ◯ | ◯ | ⊚ |
| Toner A7 | Ex. A7 | ⊚ | ◯ | ⊚ | ⊚ |
| Toner A8 | Ex. A8 | ⊚ | Δ | ◯ | Δ |
| Comp. Toner A1 | Comp. Ex. A1 | ◯ | X | X | X |

It can be seen from the above results that the toners containing the polyesters of Examples A1 to A8 obtained by using a fumaric acid-modified rosin in the carboxylic acid component have excellent low-temperature fixing ability even when subjected to fast printing, and excellent storage ability even under severe environmental conditions, and maintain excellent durability upon continuous fast printing. On the other hand, the toner containing the polyester of Comparative Example A1 using an unpurified rosin does not sufficient storage ability and durability due to the low glass transition temperature of the polyester, and is also disadvantageous in odor.

Examples B1 to B5, and B7 to B9 and Comparative Example B1

A 5-liter four-necked flask equipped with a fractional tube through which hot water at 98° C. was allowed to flow, the fractional tube being equipped with a reflux condenser through which a cold water at room temperature was allowed to flow at the top thereof, a nitrogen inlet tube, a dehydration tube, a stirrer and a thermocouple was charged with an alcohol component, a carboxylic acid component other than trimellitic anhydride, and an esterification catalyst, as shown in Table 4, and the mixture was subjected to a polycondensation reaction at 160° C. for 2 hours under nitrogen atmosphere, the temperature of the reaction mixture was then raised to 210° C. over 6 hours, and thereafter the reaction mixture was allowed to react at 66 kPa for 1 hour. After cooling the mixture to a temperature of 200° C., the trimellitic anhydride shown in Table 4 was introduced into the mixture, and the mixture was allowed to react thereat for 1 hour under normal pressure (101.3 kPa). Thereafter, the temperature of the reaction mixture was then raised to 210° C., and the reaction mixture was then allowed to react at 40 kPa until a desired softening point was reached, to give each of the polyesters.

Example B6

A 5-liter four-necked flask equipped with a fractional tube through which hot water at 98° C. was allowed to flow, the fractional tube being equipped with a reflux condenser through which a cold water at room temperature was allowed to flow at the top thereof, a nitrogen inlet tube, a dehydration tube, a stirrer and a thermocouple was charged with an alcohol component except for glycerol, a carboxylic acid component except for trimellitic anhydride, and an esterification catalyst, as shown in Table 4, and the mixture was subjected to a polycondensation reaction at 160° C. for 2 hours under nitrogen atmosphere, the temperature of the reaction mixture was then raised to 210° C. over 6 hours, and thereafter the reaction mixture was allowed to react at 66 kPa for 1 hour. After cooling the mixture to a temperature of 180° C., the glycerol shown in Table 4 was introduced into the mixture, and the temperature was raised to 200° C. at a rate of 5° C./30 minutes. Further, the mixture was allowed to react at 200° C. for 1 hour under normal pressure (101.3 kPa), and thereafter the reaction mixture was allowed to react at 66 kPa for 1 hour. Thereafter, the trimellitic anhydride shown in Table 4 was introduced into the mixture, and the mixture was allowed to react threat for 1 hour under normal pressure (101.3 kPa). Thereafter, the temperature of the reaction mixture was raised to 210° C., and the reaction mixture was then allowed to react at 40 kPa until a desired softening point was reached, to give a polyester.

TABLE 4

| | Ex. B1 | Ex. B2 | Ex. B3 | Ex. B4 | Ex. B5 | Ex. B6 | Ex. B7 | Ex. B8 | Ex. B9 | Comp. Ex. B1 |
|---|---|---|---|---|---|---|---|---|---|---|
| Alcohol Component | | | | | | | | | | |
| 1,2-Propanediol | 851 g | 851 g | 851 g | 851 g | 851 g | 851 g | 1216 g | 851 g | 851 g | 851 g |
| 1,3-Propanediol | 122 g | 122 g | 122 g | 122 g | 122 g | 122 g | — | — | — | 122 g |
| 1,4-Butanediol | — | — | — | — | — | — | — | 144 g | — | — |
| BPA-PO[1] | — | — | — | — | — | — | — | — | 560 g | — |
| Glycerol | 294 g | 294 g | 294 g | 294 g | 294 g | 294 g | — | 294 g | 294 g | 294 g |
| Carboxylic Acid Component | | | | | | | | | | |
| Terephthalic Acid | 1859 g | 1859 g | 1859 g | 1859 g | 1859 g | 1859 g | 1859 g | 1859 g | 1859 g | 1859 g |
| Trimellitic Anhydride | 399 g | 399 g | 399 g | 399 g | 399 g | 399 g | 399 g | 399 g | 399 g | 399 g |
| Unpurified Rosin* | — | — | — | — | — | — | — | — | — | 528 g |
| Fumaric Acid-Modifed Rosin A | 717 g | — | — | — | 358 g | 1075 g | 717 g | 717 g | 717 g | — |
| Fumaric Acid-Modifed Rosin B | — | 717 g | — | — | — | — | — | — | — | — |
| Fumaric Acid-Modifed Rosin C | — | — | 717 g | — | — | — | — | — | — | — |
| Fumaric Acid-Modifed Rosin D | — | — | — | 717 g | — | — | — | — | — | — |
| Esterification Catalyst | | | | | | | | | | |
| Dibutyltin Oxide | — | — | — | — | — | — | — | 25 g | — | — |
| Tin(II) Dioctanoate | 25 g | 25 | 25 | 25 g | — | 25 g | — | — | 25 g | 25 g |
| Titanium Diisopropylate Bis(Triethanolaminate) | — | — | — | — | 25 g | — | 25 g | — | — | — |
| Amount (% by weight) of Rosin Contained in Carboxylic Acid Component | 24.1 | 24.1 | 24.1 | 24.1 | 13.7 | 32.3 | 24.1 | 24.1 | 24.1 | 19.0 |
| Physical Properties of Polyester | | | | | | | | | | |
| Acid Value (mg KOH/g) | 38.4 | 36.2 | 33.7 | 28.7 | 25.4 | 43.9 | 34.2 | 31.6 | 31.5 | 33.1 |
| Hydroxyl Value (mg KOH/g) | 20.4 | 21.5 | 18.7 | 17.9 | 18.8 | 14.3 | 16.8 | 14.1 | 22.3 | 16.4 |
| Softening Point (° C.) | 119.1 | 116.5 | 115.4 | 113.1 | 116.7 | 110.1 | 103.6 | 113.4 | 120.6 | 104.2 |
| Glass Transition Temperature (° C.) | 65.8 | 63.1 | 62.3 | 59.6 | 61.3 | 57.1 | 63.4 | 58.7 | 65.1 | 55.4 |
| Amount (% by weight) of Low-Molecular Component Having Molecular Weight of 500 or Less, Contained in Carboxylic Acid Component | 6.2 | 6.8 | 7.3 | 8.1 | 6.8 | 10.4 | 7.9 | 6.7 | 6.8 | 15.8 |

*Unmodifed Rosin

[1]Polyoxypropylene(2.2)-2,2-bis(4-hydroxyphenyl)propane

Toners were prepared in the same manner as in Production Example A1 of Toner using 100 parts by weight of the polyester obtained in each of Examples B1 to B9 and Comparative Example B1 shown in Table 4, to give each of toners B1 to B9 and a comparative toner B1, respectively.

The low-temperature fixing ability, the storage ability, and the odor were evaluated in the same manner as in Test Examples A1 to A4, and the pulverizability was evaluated in accordance with the following method. Here, in Test Example A1, the fixing speed of the fixing device was changed to 125 mm/s, and at the same time, the generation of hot offset was visually observed, and the offset resistance was evaluated in accordance with the following evaluation criteria. The results are shown in Table 5.

[Evaluation Criteria for Offset Resistance]
⊚: The hot offset is not generated even at 240° C.
○: The hot offset is generated at 220° C. or higher and 240° C. or lower.
△: The hot offset is generated at 190° C. or higher and lower than 220° C.
x: The hot offset is generated at a temperature of lower than 190° C.

Test Example B1

Pulverizability

Each of the polyesters obtained in Examples B1 to B9 and Comparative Example B1 were roughly pulverized and sieved, to obtain a resin powder having a size passing 16 mesh (sieve opening: 1 mm) and not passing 22 mesh (sieve opening: 710 μm). This classified resin powder was accurately weight in an amount of 10.00 g, and the resin powder was pulverized with Mill & Mixer Model MM-I (manufactured by Hitachi Living Systems, Ltd.) for 30 seconds, and the pulverized product was applied to a 30 mesh (sieve opening: 500 μm)-sieve, the weight (A) g of the not passed resin was accurately weighed, and the residual ratio was calculated by the following formula. The procedures were carried out three times, and averaged, and the obtained value was obtained as a pulverizability index, and the pulverizability was evaluated in accordance with the following evaluation criteria. The results are shown in Table 5.

$$\text{Residual Ratio} = \frac{(A)}{\text{Resin Weight (10.00 g)}} \times 100$$
Before Pulverization

[Evaluation Criteria]

⊚: The pulverizability index is less than 5.

○: The pulverizability index is 5 or more and less than 15.

x: The pulverizability index is 15 or more.

TABLE 5

| | Polyester | Low-Temp. Fixing Ability | Offset Resistance | Storage Ability | Durability | Pulverizability | Odor |
|---|---|---|---|---|---|---|---|
| Toner B1 | Ex. B1 | ⊚ | ⊚ | ⊚ | ⊚ | ⊚ | ⊚ |
| Toner B2 | EX. B2 | ⊚ | ⊚ | ○ | ⊚ | ○ | ⊚ |
| Toner B3 | Ex. B3 | ⊚ | ○ | ○ | ○ | ○ | ⊚ |
| Toner B4 | EX. B4 | ⊚ | ⊚ | ○ | ○ | ○ | △ |
| Toner B5 | Ex. B5 | ○ | ○ | ⊚ | ⊚ | ⊚ | ⊚ |
| Toner B6 | Ex. B6 | ⊚ | ○ | △ | ○ | ○ | ⊚ |
| Toner B7 | Ex. B7 | ⊚ | ○ | ⊚ | ○ | ⊚ | ⊚ |
| Toner B8 | Ex. B8 | ⊚ | ⊚ | ○ | ⊚ | ○ | ⊚ |
| Toner B9 | Ex. B9 | ⊚ | ○ | ⊚ | ⊚ | ○ | ⊚ |
| Comp. Toner B1 | Comp. Ex. B1 | ○ | △ | X | X | X | X |

It can be seen from the above results that the toners containing the polyesters of Examples B1 to B9 obtained by using an aliphatic polyhydric alcohol in the alcohol component and a fumaric acid-modified rosin in the carboxylic acid component have not only excellent low-temperature fixing ability and durability but also excellent offset resistance and pulverizability, and have excellent storage ability even under severe environmental conditions. On the other hand, the toner containing the polyester of Comparative Example B1 using an unpurified rosin contains a low-molecular weight component in a large amount in the polyester, so that the toner does not have sufficient storage ability and pulverizability, and is also disadvantageous in odor.

The polyester for a toner of the present invention is usable as a resin binder for a toner usable in, for example, developing electrostatic latent images formed in electrophotography, electrostatic recording method, electrostatic printing method or the like.

The invention claimed is:

1. A toner comprising a releasing agent and a polyester, which polyester is obtainable by polycondensing an alcohol component and a carboxylic acid component comprising a fumaric acid-modified rosin, wherein the fumaric acid-modified rosin is obtainable by modifying a purified rosin with fumaric acid, wherein the purified rosin is one in which a peak intensity of hexanoic acid is $0.8 \times 10^7$ or less, a peak intensity of pentanoic acid is $0.4 \times 10^7$ or less, and a peak intensity of benzaldehyde is $0.4 \times 10^7$ or less, under measurement conditions for headspace GC-MS method.

2. The toner according to claim 1, wherein the fumaric acid-modified rosin is contained in an amount of from 5 to 85% by weight of the carboxylic acid component.

3. The toner according to claim 2, wherein the amount is from 10 to 50% by weight of the carboxylic acid component.

4. The toner according to claim 1, wherein the alcohol component comprises an aliphatic polyhydric alcohol.

5. The toner according to claim 4, wherein the aliphatic polyhydric alcohol comprises an aliphatic polyhydric alcohol having 2 to 6 carbon atoms.

6. The toner according to claim 1, wherein the alcohol component and/or the carboxylic acid component comprises a trihydric or higher polyhydric alcohol and/or a tricarboxylic or higher polycarboxylic acid compound.

7. The toner according to claim 1, wherein the polycondensation is carried out in the presence of a titanium compound and/or a tin(II) compound without containing a Sn—C bond.

8. The toner according to claim 1, wherein the rosin has a modification degree with fumaric acid of from 5 to 105.

9. The toner according to claim 1, wherein the rosin has a modification degree with fumaric acid of from 20 to 105.

10. The toner according to claim 1, wherein the rosin has a modification degree with fumaric acid of from 40 to 105.

11. The toner according to claim 1, wherein the rosin has a modification degree with fumaric acid of from 60 to 105.

12. The toner according to claim 1, wherein the fumaric acid-modified rosin has a glass transition temperature of 40 to 90° C.

13. The toner according to claim 1, wherein the fumaric acid-modified rosin has a glass transition temperature of 45 to 85° C.

14. The toner according to claim 1, wherein the fumaric acid-modified rosin has a glass transition temperature of 50 to 80° C.

15. The toner according to claim 1, wherein the fumaric acid-modified rosin is obtained by reacting a rosin and fumaric acid in the presence of a phenol.

16. The toner according to claim 15, wherein the phenol is a dihydric phenol or a hindered phenol.

17. The toner according to claim 1, which contains at least one additive selected from the group consisting of a colorant, a charge control agent, a magnetic powder, a fluidity improver, an electric conductivity modifier, an extender, a reinforcing filler, an antioxidant, an anti-aging agent, and a cleanability improver.

18. The toner according to claim 1, wherein the fumaric acid-modified rosin is obtained by reacting, as the only reactants, a rosin and fumaric acid.

* * * * *